A. E. WINTER.
TIRE.
APPLICATION FILED MAR. 22, 1910.

1,015,113.

Patented Jan. 16, 1912.

2 SHEETS—SHEET 1.

Witnesses
Gilson Shaffer
Laura S. Inman

Inventor
AUGUST E. WINTER
By Edward R. Inman
Attorney

A. E. WINTER.
TIRE.
APPLICATION FILED MAR. 22, 1910.

1,015,113.

Patented Jan. 16, 1912.

2 SHEETS—SHEET 2.

Witnesses
Gilson Shaffer
Laura S. Inman

Inventor
AUGUST E. WINTER
By Edward R. Inman
Attorney

UNITED STATES PATENT OFFICE.

AUGUST E. WINTER, OF FRANKLIN, PENNSYLVANIA.

TIRE.

1,015,113.  Specification of Letters Patent.  Patented Jan. 16, 1912.

Application filed March 22, 1910. Serial No. 550,896.

*To all whom it may concern:*

Be it known that I, AUGUST E. WINTER, citizen of the United States, residing at Franklin, in the county of Venango and State of Pennsylvania, have invented certain new and useful Improvements in Tires, of which the following is a specification.

The object of my invention is to provide a resilient, metallic tire for automobile wheels and other vehicles, and the construction and application of my tire are herein fully set forth, reference being had to the accompanying drawings, which form a part hereof, and in which—

Figure 1:
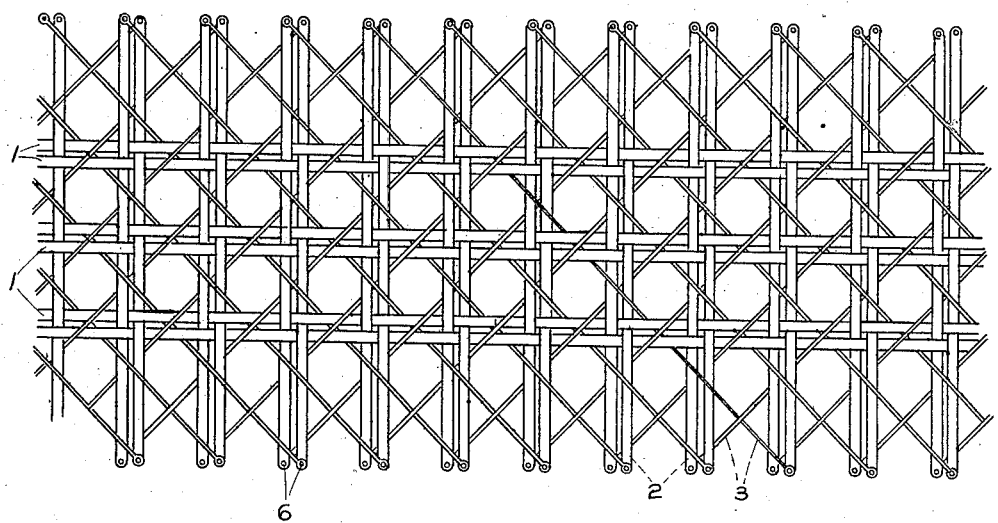
Figure 2:
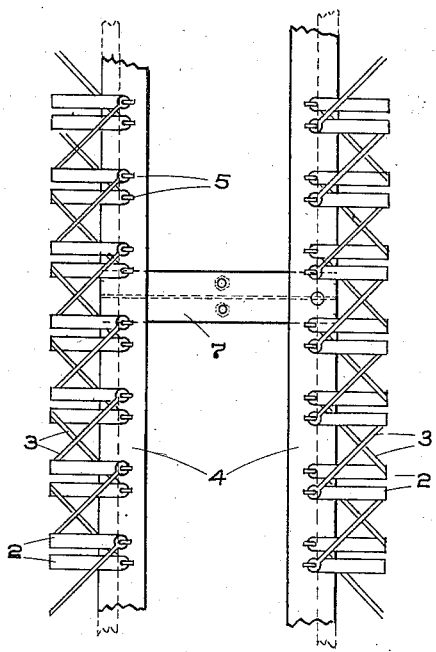
Figure 3:
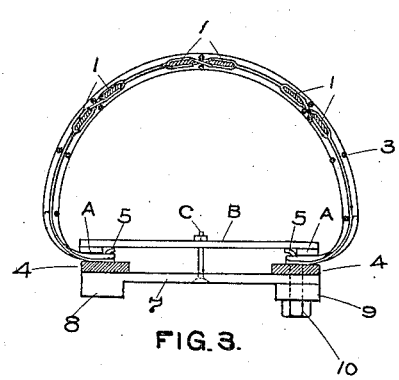
Figure 4:
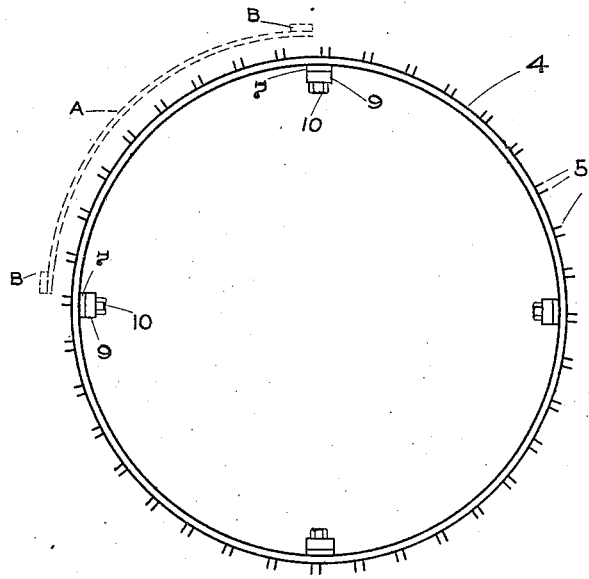
Figures 5, 6, 7:
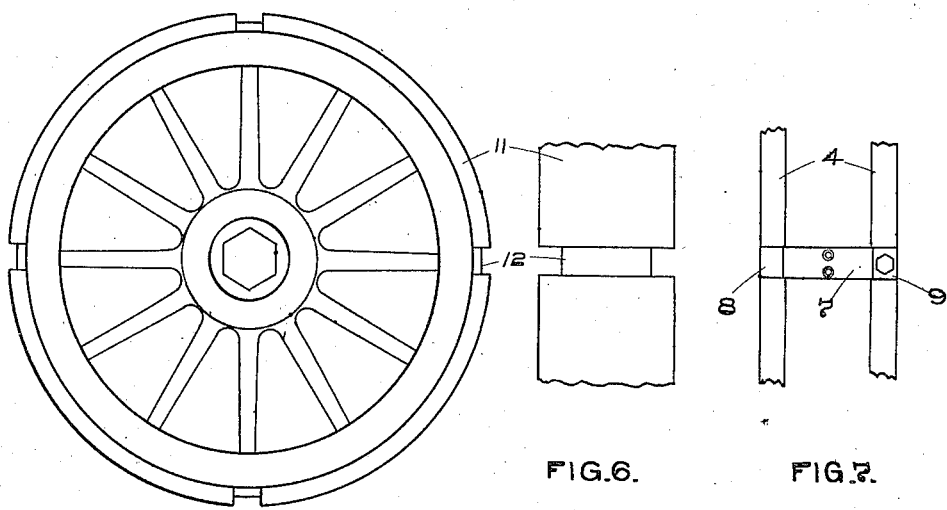
Figure 8:
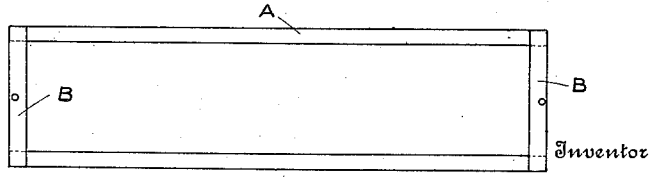

Figure 1 is a plan view of a flat or plan view of my improved tire fabric, and is intended to show particularly how the same is woven. Fig. 2 shows how my woven fabric is attached to the tire rings. Fig. 3 is a transverse section of my tire in its completed form, ready for a wheel. Fig. 4 is a side elevation of my tire rings, to which the edges of the fabric are attached. Fig. 5 is a side elevation of a wheel adapted for the reception of my tire. Fig. 6 is a plan of a portion of the periphery of the wheel shown in Fig. 5. Fig. 7 is a fragment of the tire rings shown in Fig. 4 as they appear from the inside, showing especially the transverse strip by means of which the tire rings are connected together. Fig. 8 is a plan view of the fabric-retaining guard.

My tire consists of a woven, metallic netting or fabric composed of a plurality of flat strips 1, which extend longitudinally of the tire, and a plurality of flat strips 2 which are positioned and lie transversely to strips 1, and across the same at a right angle. Interwoven with said flat strips 1 and 2 are diagonally-disposed round members or rods 3, which cross strips 1 and 2 at an angle of about forty-five degrees, and the ends of said round diagonal members 3 coincide with the ends of certain of the transverse strips 2, as shown in Fig. 1, so that the two coinciding ends may be attached to the tire rings 4—4 by means of the same attaching device, which preferably is a hook 5, there being an eye 6 in the ends of each of the strips 2 and rods 3, adapted to engage said hooks. When the fabric or network of the tire is formed into an endless, longitudinal semi-roll of the shape shown in Fig. 3, the eyes 6 engage their respective hooks, and in this shape, the tendency of the fabric to recoil causes it to be retained in firm engagement with said hooks, and it cannot be accidentally displaced. In order, however, to make the attachment of said fabric doubly secure, I provide a retainer—Fig. 8—which consists of segmental frames having the longitudinal strips A and the end pieces B. When the retainer is in position, the longitudinal strips A rest against the fabric, just outside the hooks 5, as shown in Fig. 3, and in dotted lines in Fig. 2. The retainers are held in position by means of the bolts C, which pass through the strips 7 and the end pieces B.

There are any suitable number of connecting strips or ties 7, by means of which the tire rings 4 are connected together transversely, and each of said strips 7 is provided at its respective outer ends with a lug 8 and 9 which engage the sides of the rim 11 of the wheel and hold the tire in position laterally. The lug 9 is shown as a removable block which may be removed by taking out the screw 10 so that the tire may be easily and quickly removed by slipping the same laterally from the wheel for making repairs.

In the rim 11 of the wheel are formed a number of transverse seats or grooves 12 for the reception of the ties 7 which hold the tire rings together. When the tire is in position upon the wheel, the rings 4 fit closely upon the periphery of the rim 11, the strips 7 occupy the seats 12, and the lugs 8 and 9 bear against the respective sides of said rim 11, and the tire is thus held firmly in position.

I claim—

1. A resilient, metallic tire for vehicle wheels, consisting of the combination of flat strips and round members interwoven into a fabric, said fabric being formed into a longitudinal, endless semi-roll, tire rings to which the respective edges of said fabric are attached, and transverse strips connecting said rings, in combination with a wheel, to the rim of which said rings are removably secured.

2. A resilient tire for vehicle wheels, consisting of a fabric composed of flat strips extending longitudinally of said tire, flat strips transversely interwoven with said longitudinal strips, round members diagonally interwoven with said longitudinal and transverse strips, tire rings to which the ends of said transverse flat strips and diagonal round members are so attached as to form a semi-roll, and transverse connecting members for said tire rings, in combination with a wheel, to the rim of which said rings and the thereto-attached fabric are removably attached.

In testimony whereof I affix my signature in presence of two witnesses.

AUGUST E. WINTER.

Witnesses:
D. WILHELM,
INA WILHELM.

Copies of this patent may be obtained for five cents each, by addressing the "Commissioner of Patents, Washington, D. C."